(12) United States Patent
Berkley (10) Patent No.: US 9,870,277 B2
(45) Date of Patent: *Jan. 16, 2018

(54) SYSTEMS AND METHODS FOR ERROR CORRECTION IN QUANTUM COMPUTATION

(71) Applicant: D-Wave Systems Inc., Burnaby (CA)

(72) Inventor: Andrew J. Berkley, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 153 days.

This patent is subject to a terminal disclaimer.

(21) Appl. No.: 14/778,478

(22) PCT Filed: Feb. 5, 2014

(86) PCT No.: PCT/US2014/014836
§ 371 (c)(1),
(2) Date: Sep. 18, 2015

(87) PCT Pub. No.: WO2014/123980
PCT Pub. Date: Aug. 14, 2014

(65) Prior Publication Data
US 2016/0085616 A1    Mar. 24, 2016

Related U.S. Application Data

(60) Provisional application No. 61/761,100, filed on Feb. 5, 2013.

(51) Int. Cl.
| | |
|---|---|
| *G06F 11/07* | (2006.01) |
| *G06N 99/00* | (2010.01) |
| *G06F 11/14* | (2006.01) |
| *G06F 11/10* | (2006.01) |

(52) U.S. Cl.
CPC .......... *G06F 11/0724* (2013.01); *G06F 11/10* (2013.01); *G06F 11/1492* (2013.01); *G06N 99/002* (2013.01)

(58) Field of Classification Search
CPC .. G06F 11/0724; G06F 11/10; G06F 11/1492; G06N 99/002
See application file for complete search history.

(56) References Cited

U.S. PATENT DOCUMENTS

| | | |
|---|---|---|
| 6,838,694 B2 | 1/2005 | Esteve et al. |
| 7,135,701 B2 | 11/2006 | Amin et al. |

(Continued)

FOREIGN PATENT DOCUMENTS

WO    2012/064974 A2    5/2012

OTHER PUBLICATIONS

Amin, "Effect of Local Minima on Adiabatic Quantum Optimization," *Physical Review Letters* 100(13):130503-1-130503-4, Apr. 2008.

(Continued)

*Primary Examiner* — April Y Blair
*Assistant Examiner* — Rong Tang
(74) *Attorney, Agent, or Firm* — Seed IP Law Group LLP (57) ABSTRACT

The effects of decoherence and/or noise in adiabatic quantum computation and quantum annealing are reduced by implementing replica coding schemes. Multiple instances of the same problem are mapped to respective subsets of the qubits and coupling devices of a quantum processor. The multiple instances are evolved simultaneously in the presence of coupling between the qubits of different instances. Quantum processor architectures that are adapted to facilitate replica coding are also described.

20 Claims, 6 Drawing Sheets

(56) References Cited

U.S. PATENT DOCUMENTS

| | | | |
|---|---|---|---|
| 7,307,275 | B2 | 12/2007 | Lidar et al. |
| 7,335,909 | B2 | 2/2008 | Amin et al. |
| 7,418,283 | B2 | 8/2008 | Amin |
| 7,533,068 | B2 | 5/2009 | Maassen van den Brink et al. |
| 7,619,437 | B2 | 11/2009 | Thom et al. |
| 7,858,966 | B2 | 12/2010 | Kitaev |
| 7,876,248 | B2 | 1/2011 | Berkley et al. |
| 7,966,549 | B2 | 6/2011 | Hollenberg et al. |
| 8,008,942 | B2 | 8/2011 | van den Brink et al. |
| 8,035,540 | B2 | 10/2011 | Berkley et al. |
| 8,190,548 | B2 | 5/2012 | Choi |
| 8,195,596 | B2 | 6/2012 | Rose et al. |
| 8,234,103 | B2 * | 7/2012 | Biamonte .............. B82Y 10/00 703/15 |
| 8,421,053 | B2 | 4/2013 | Bunyk et al. |
| 8,510,618 | B1 | 8/2013 | Pesetski et al. |
| 2006/0147154 | A1 * | 7/2006 | Thom .................... B82Y 10/00 385/37 |
| 2008/0176750 | A1 | 7/2008 | Rose et al. |
| 2012/0265718 | A1 | 10/2012 | Amin et al. |

OTHER PUBLICATIONS

Blatter et al., "Design aspects of superconduction-phase quantum bits," *Physical Review B 63*(17):174511-1-174511-9, Apr. 11, 2001.

Devitt et al., "Quantum Error Correction for Beginners," *arXiv:0905.2794v4 [quant ph]*, Jun. 21, 2013, 41 pages.

Friedman et al., "Quantum superposition of distinct macroscopic states," *Nature 406*:43-46, Jul. 6, 2000.

Il'ichev et al., "Continuous Monitoring of Rabi Oscillations in a Josephson Flux Qubit," *Physical Review Letters 91*(9):097906-1-097906-4, Aug. 29, 2003.

International Search Report dated Jun. 24, 2014 for International Application No. PCT/US14/14836, 2 pages.

Jordan et al., "Error Correcting Codes for Adiabatic Quantum Computation," *arXiv:quant-ph/0512170v3*, Oct. 10, 2006, 5 pages.

Lidar, "Towards Fault Tolerant Adiabatic Quantum Computation," *arXiv:0707.0021v3 [quant-ph]*, May 2, 2008, 4 pages.

Makhlin et al., "Quantum-state engineering with Josephson-junction devices," *Reviews of Modern Physics 73*(2):357-400, Apr. 2001.

Mooji et al., "Josephson Persistent-Current Qubit," *Science 285*:1036-1039, Aug. 13, 1999.

Orlando et al., "Superconducting persistent-current qubit," *Physical Review B 60*(22): 15398-15413, Dec. 1, 1999.

Pudenz et al., "Error corrected quantum annealing with hundreds of qubits," *arXiv: 1307.8190v1 [quant ph]*, Jul. 31, 2013, 18 pages.

Sarovar et al., "Error suppression and error correction in adiabatic quantum computation: non-equilibrium dynamics," *New Journal of Physics 15*(125032), 2013, 36 pages.

Written Opinion dated Jun. 24, 2014 for International Application No. PCT/US 14/14836, 10 pages.

Young et al., "Adiabatic quantum optimization with the wrong Hamiltonian," *arXiv:1310.0529v1 [quant ph]*, Oct. 2, 2013, 8 pages.

Young et al., "Error Suppression and Error Correction in Adiabatic Quantum Computation: Techniques and Challenges," *Physical Review X 3*:041013-1-041013-13, 2013.

\* cited by examiner

SYSTEMS AND METHODS FOR ERROR CORRECTION IN QUANTUM COMPUTATION

BACKGROUND

Field

The present systems and methods generally relate to error correction in quantum computation and particularly relate to error correction in implementations of adiabatic quantum computation and quantum annealing.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems and methods, an "adiabatic" evolution is considered to be an evolution that satisfies the adiabatic condition:

$$\dot{s}|<1|dH_e/ds|0>|=\delta g^2(s)$$

where $\dot{s}$ is the time derivative of s, g(s) is the difference in energy between the ground state and first excited state of the system (also referred to herein as the "gap size") as a function of s, and δ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in, for example, U.S. Pat. Nos. 7,135,701 and 7,418,283.

Quantum Annealing

Quantum annealing is a computation method that may be used to find a low-energy state, typically preferably the ground state, of a system. Somewhat similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian (e.g., the Hamiltonian of an Ising spin glass) and therefore quantum annealing may be used to find the solution to such a hard problem. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close to the exact solution. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. Further details and embodiments of exemplary quantum processors that may be used in conjunction with the present systems and methods are described in, for example, U.S. Pat. Nos. 7,533,068, 8,008,942, US Patent Publication 2008-0176750 (now U.S.

Pat. No. 8,195,596), US Patent Publication 2009-0121215 (now U.S. Pat. No. 8,190,548), and US Patent Publication 2011-0022820 (now U.S. Pat. No. 8,421,053).

BRIEF SUMMARY

A quantum processor may be summarized as including a first set of qubits and a first set of coupling devices providing communicative coupling between qubits in the first set of qubits; a first set of replica qubits and a first set of replica coupling devices providing communicative coupling between the first set of replica qubits, wherein for each qubit in the first set of qubits a corresponding replica qubit exists in the first set of replica qubits, and for each coupling device in the first set of coupling devices a replica coupling device exists in the first set of replica coupling devices; and a second set of coupling devices, wherein each coupling device in the second set of coupling devices provides communicative coupling between a qubit in the first set of qubits and the corresponding replica qubit in the first set of replica qubits. The quantum processor may include a superconducting quantum processor, the qubits may include superconducting qubits, and the coupling devices may include superconducting coupling devices.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors, drive circuitry and non-transitory computer- or processor-readable media such as nonvolatile memory for instance read only memory (ROM), electronically erasable programmable ROM (EEPROM) or FLASH memory, etc., or volatile memory for instance static or dynamic random access memory (ROM) have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors, including a grid or distributed network of multiple quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for error correction in quantum computation. More specifically, the various embodiments described herein provide systems and methods for implementing error correction protocols in quantum processors designed to perform adiabatic quantum computation and/or quantum annealing algorithms.

As an illustrative example, a superconducting quantum processor designed to perform adiabatic quantum computation and/or quantum annealing is used in the description that follows. However, a person of skill in the art will appreciate that the present systems and methods may be applied to any form of quantum processor hardware (e.g., superconducting, photonic, ion-trap, quantum dot, topological, etc.) implementing any form of quantum algorithm(s) (e.g., adiabatic quantum computation, quantum annealing, gate/circuit-based quantum computing, etc.).

A typical adiabatic evolution may be represented by Equation 1:

$$H_e = (1-s)H_{In} + sH_f \quad (1)$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to adiabatic quantum computation ("AQC"), described, for example, in Amin, M. H. S., "Effect of local minima on quantum adiabatic optimization", *Physical Review Letters*, Vol. 100, 130503 (2008), is to start with an initial Hamiltonian of the form shown in Equation 2:

$$H_{In} = -\frac{1}{2}\sum_{i=1}^{N}\Delta_i\sigma_i^x \quad (2)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{N}h_i\sigma_i^z + \sum_{i,j=1}^{N}J_{ij}\sigma_i^z\sigma_j^z\right] \quad (3)$$

where N represents the number of qubits, $\sigma_i^z$ is the Pauli z-matrix for the $i^{th}$ qubit, $h_i$ and $J_{i,j}$ are dimensionless local fields for the qubits, and couplings between qubits, and $\varepsilon$ is some characteristic energy scale for $H_f$. Here, the $\sigma_i^z$ and $\sigma_i^z\sigma_j^z$ terms are examples of "diagonal" terms. Throughout this specification, the terms "final Hamiltonian" and "problem Hamiltonian" are used interchangeably. Hamiltonians such as $H_{In}$ and $H_f$ in Equations 2 and 3, respectively, may be physically realized in a variety of different ways. A particular example is realized by an implementation of superconducting qubits.

Figure 1:
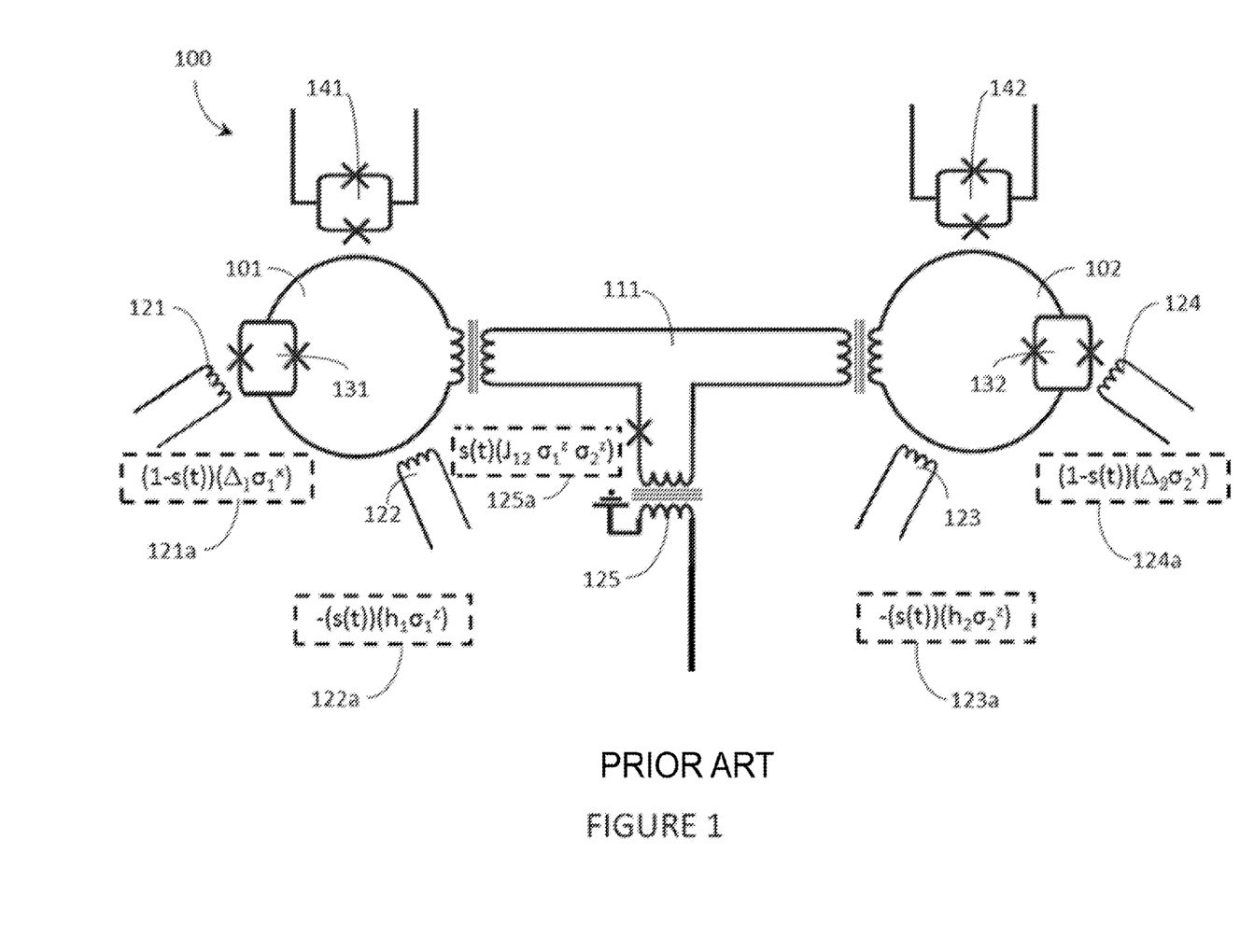
FIG. 1 is a schematic diagram of a portion of an exemplary superconducting quantum processor designed for adiabatic quantum computation (and/or quantum annealing) that may be adapted for use in accordance with the present systems and methods.

FIG. 1 is a schematic diagram of a portion of an exemplary superconducting quantum processor 100 designed for AQC (and/or quantum annealing) that may be adapted for use in accordance with the present systems and methods. The portion of superconducting quantum processor 100 shown in FIG. 1 includes two superconducting qubits 101, 102 and a tunable ZZ-coupler 111 coupling (i.e., a diagonal coupler) information therebetween (i.e., providing pair-wise coupling between qubits 101 and 102). While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize AQC and/or QA by initializing the system with the Hamiltonian described by Equation 2 and evolving the system to the Hamiltonian described by Equation 3 in accordance with the evolution described by Equation 1. Quantum processor 100 includes a plurality of interfaces 121-125 that are used to configure and control the state of quantum processor 100. Each of interfaces 121-125 may be realized by a respective inductive coupling structure, as illustrated, as part of a programming subsystem and/or an evolution subsystem. Such a programming subsystem and/or evolution subsystem may be separate from quantum processor 100, or it may be included locally (i.e., on-chip with quantum processor 100) as described in, for example, U.S. Pat. Nos. 7,876,248 and 8,035,540.

In the operation of quantum processor 100, interfaces 121 and 124 may each be used to couple a flux signal into a respective compound Josephson junction 131,132 of qubits 101 and 102, thereby realizing the $\Delta_i$ terms in the system Hamiltonian. This coupling provides the off-diagonal $\sigma^x$ terms of the Hamiltonian described by Equation 2 and these flux signals are examples of "disordering signals." Similarly, interfaces 122 and 123 may each be used to couple a flux signal into a respective qubit loop of qubits 101 and 102, thereby realizing the $h_i$ terms in the system Hamiltonian. This coupling provides the diagonal $\sigma^z$ terms of Equation 3. Furthermore, interface 125 may be used to couple a flux signal into coupler 111, thereby realizing the $J_{ij}$ term(s) in the system Hamiltonian. This coupling provides the diagonal $\sigma_i^z\sigma_j^z$ terms of Equation 3. In FIG. 1, the contribution of each of interfaces 121-125 to the system Hamiltonian is indicated in boxes 121a-125a, respectively. Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 121-125.

In the context of quantum processor 100, the term "programming subsystem" is used to generally describe the interfaces (e.g., "programming interfaces" 122, 123, and 125) used to apply the programmable parameters (e.g., the $h_i$ and $J_{ij}$ terms) to the programmable elements of quantum processor 100 and other associated control circuitry and/or instructions. As previously described, the programming interfaces of the programming subsystem may communicate with other subsystems which may be separate from the quantum processor or may be included locally on the processor. Similarly, in the context of quantum processor 100, the term "evolution subsystem" is used to generally describe the interfaces (e.g., "evolution interfaces" 121 and 124) used to evolve the programmable elements of quantum processor 100 and other associated control circuitry and/or instructions. For example, the evolution subsystem may include annealing signal lines and their corresponding interfaces (121, 124) to the qubits (101, 102).

Quantum processor 100 also includes readout devices 141 and 142, where readout device 141 is configured to read out the state of qubit 101 and readout device 142 is configured to read out the state of qubit 102. In the embodiment shown in FIG. 1, each of readout devices 141 and 142 comprises a respective DC-SQUID that is configured to inductively couple to the corresponding qubit (qubits 101 and 102, respectively). In the context of quantum processor 100, the term "readout subsystem" is used to generally describe the readout devices 141, 142 used to read out the final states of the qubits (e.g., qubits 101 and 102) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Application Publication WO 2012-064974.

While FIG. 1 illustrates only two physical qubits 101, 102, one coupler 111, and two readout devices 141, 142, a quantum processor (e.g., processor 100) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

At least some of the devices illustrated in FIG. 1 are simplified in order to enhance clarity. As an example, the structure of the qubits (101, 102) and the interface to the readout devices (141, 142) are simplified in FIG. 1 in order to reduce clutter. While the simplified circuits of quantum processor 100 may be sufficient for some applications, a quantum processor may employ qubit circuits and/or readout schemes that are considerably more complicated than those which are illustrated in FIG. 1.

Adiabatic quantum computing algorithms and quantum annealing algorithms are generally understood in the art to enjoy some robustness against the effects of decoherence and noise, at least when compared to gate/circuit model quantum computing algorithms. However, decoherence and noise effects may still influence the operation of a quantum processor implementing adiabatic/annealing algorithms. For example, decoherence and noise effects may cause the actual parameters realized in the problem Hamiltonian (i.e., Equation 3) to diverge from the parameters intended to be programmed via programming interfaces 121-125 such that the quantum processor may ultimately "solve" a problem that is different from the target problem that the quantum processor was programmed to solve. The present systems and methods provide schemes for correcting such unwanted errors.

Some error-correcting codes for adiabatic quantum computation (e.g., Jordan et al., "Error-correcting codes for adiabatic quantum computation," *Physical Review A*, 74 052322 (2006)) have been proposed in the art, but these proposals typically require higher-order interactions between qubits and multiple X, Y, and Z interactions between qubits (e.g., 4-local and 6-local X, Y, and Z Hamiltonians as opposed to the 2-local Z Hamiltonian of Equation 3 that is realizable by the pair-wise ZZ-coupling in processor 100) and/or high bandwidth control to enable precise gate application. The present systems and methods provide error correction schemes that may be implemented using low bandwidth control and easier-to-implement 2-local Z Hamiltonians such as Equation 3.

In accordance with the present systems and methods, a quantum processor designed to perform adiabatic and/or annealing algorithms (e.g., processor 100 from FIG. 1) may be adapted to implement a replica coding scheme in order to reduce the effects of decoherence and noise. As an example, the problem Hamiltonian (e.g., Equation 3) may be adapted to use linearly more qubits to achieve an exponential decrease in the effects of decoherence and noise. The problem Hamiltonian may be adapted, for example, by encoding multiple identical instances (or "replicas") of the problem within the quantum processor architecture.

Figure 2:
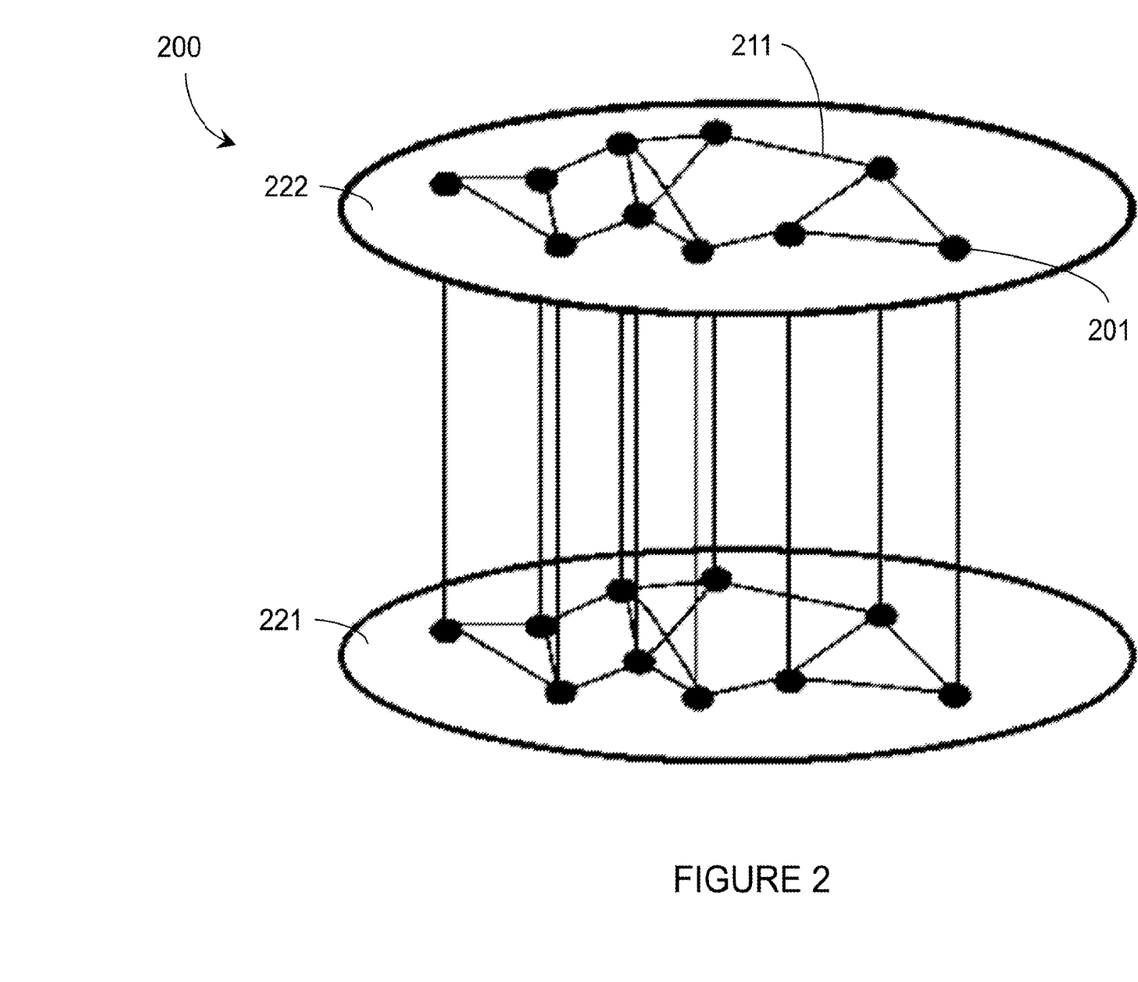
FIG. 2 is an illustrative diagram showing an exemplary plurality of instances of replica coding in accordance with the present systems and methods.

FIG. 2 is an illustrative diagram showing an exemplary plurality of instances 200 of replica coding in accordance with the present systems and methods. In FIG. 2, nodes 201 represent qubits (only one called out in the Figure to reduce clutter), lines 211 represent coupling devices (only one called out in the Figure to reduce clutter), and circles 221, 222 represent problem instances. Instance 221 represents a first instance of a problem programmed into a quantum processor, such as an instance of Equation 3 programmed into quantum processor 100 (with processor 100 being extended to include at least ten qubits and at least fifteen couplers). In accordance with the present systems and methods, the effects of decoherence and noise on the solution of problem instance 221 may be reduced by simultaneously programming a second instance 222 into a separate set of qubits and couplers in the quantum processor and coupling at least some of the qubits of the second instance 222 to the first instance 221. In this sense, second instance 222 is a copy or "replica" of first instance 221. When the quantum processor is evolved, both the first instance 221 and the second instance 222 of the same problem are "solved" simultaneously and coupled together to effectively shrink the influence of decoherence and noise. The coupling between replicas (e.g., the coupling between instances 221 and 222) provides a mechanism for correcting or stabilizing any errors or anomalies that may appear in any specific qubit 201 or instance 221, 222 by effectively smearing out the influence of noise. For example, if a form of noise has an influence of X on a qubit in instance 221, then that same form of noise may have an influence of about X/2 on the same qubit in instance 221 when that qubit is coupled to a replica qubit in instance 222. In accordance with the present systems and methods, the influence of decoherence/noise may be inversely proportional to the number of replica instances in the quantum processor such that the influence of decoherence/noise may decrease as the number of replica instances increases. Thus, while FIG. 2 depicts two instances 221, 222 of a problem, any number of instances (i.e., any number of replicas, such as 2 replicas, 5 replicas, 10 replicas, 20 replicas, 100 replicas, etc.) may be employed provided there are sufficient qubits in the quantum processor to encode each instance.

The coupling between replicas/instances (e.g., the coupling between qubits of instance 221 with qubits of instance 222) may be weaker than the coupling between qubits of the same instance (e.g., the coupling between qubits within instance 221). In some implementations, the coupling between qubits of instance 221 with qubits of replicas is fewer than the number of qubits in qubits of instance 221. In some embodiments, the coupling between qubits of instance 221 with qubits of replicas is equal to the number of qubits in qubits of instance 221. In some embodiments, the coupling between qubits of instance 221 with qubits of replicas is a diagonal coupling. In some embodiments, replica qubits may be programmed slightly differently from one another (and/or some pairs of replica qubits may be coupled together slightly differently from other pairs of replica qubits) in order to realize specific error correction codes, such as for example, a majority voting scheme.

In some implementations, the strength of the coupling between problem instances and replicas is weak compared to the coupling between qubits of the same instance. In some implementations, the strength of a coupling is measured, represented or determined by the energy of the coupling relative to a characteristic energy of the problem programmed into the quantum processor. The characteristic energy of the problem programmed into the quantum processor can be the maximum coupling value, the maximum bias value, or a combination of the two. Thus, a weaker coupling is smaller than the characteristic energy. A strong coupling is one greater than the characteristic energy. In some implementations, a weak coupling is greater than noise in the problem programmed into the quantum processor while operating the quantum processor, if any. In some implementations, this noise is a fraction of the characteristic energy. In some embodiments, the noise is $1/1000$ of the characteristic energy. In others, the noise is about $1/100$ of the characteristic energy. In other implementations, the noise is about a $1/20$ of the characteristic energy. In still other implementations, the noise is about a $1/5$ of the characteristic energy.

In some implementations, the coupling between problem instances and replicas is weak but about and greater than the noise. In some implementations, the coupling between problem instances and replicas is weak but equal to and greater than the noise. In some implementations the coupling strength as a ratio of the characteristic energy is within a range. Example ranges include: $1/100,000$ to $1/2$; $1/100$ to $1/10$; and $1/25$ to $1/15$.

In accordance with the present systems and methods, replica coding schemes may be implemented in existing adiabatic quantum computing processors and/or quantum annealing processors provided a sufficient architecture of qubits and coupling devices exists to encode the problem instance and at least one (but potentially many more than one) replica instance. However, a quantum processor architecture may also be specifically adapted to facilitate replica coding.

A quantum processor architecture may be specifically adapted to implement replica coding by physically arranging replica qubits sets in the quantum processor architecture. For example, a first set of qubits and coupling devices may be arranged on a first layer of a quantum processor, a first set of replica qubits and replica coupling devices may be arranged on a second layer of the quantum processor with at least some qubits in the first set of replica qubits communicatively coupleable (e.g., weakly communicatively coupleable via coupling devices) to corresponding qubits in the first set of qubits, a second set of replica qubits and replica coupling devices may be arranged on a third layer of the quantum processor with at least some qubits in the second set of replica qubits communicatively coupleable (e.g., weakly communicatively coupleable via coupling devices) to corresponding qubits in either the first set of qubits, the first set of replica qubits, or both the first set of qubits and the first set of replica qubits, and so on, for any number of sets of replica qubits and replica coupling devices. In some embodiments, qubits from different replica sets may be included within the same physical layer of the quantum processor architecture.

Figure 3:
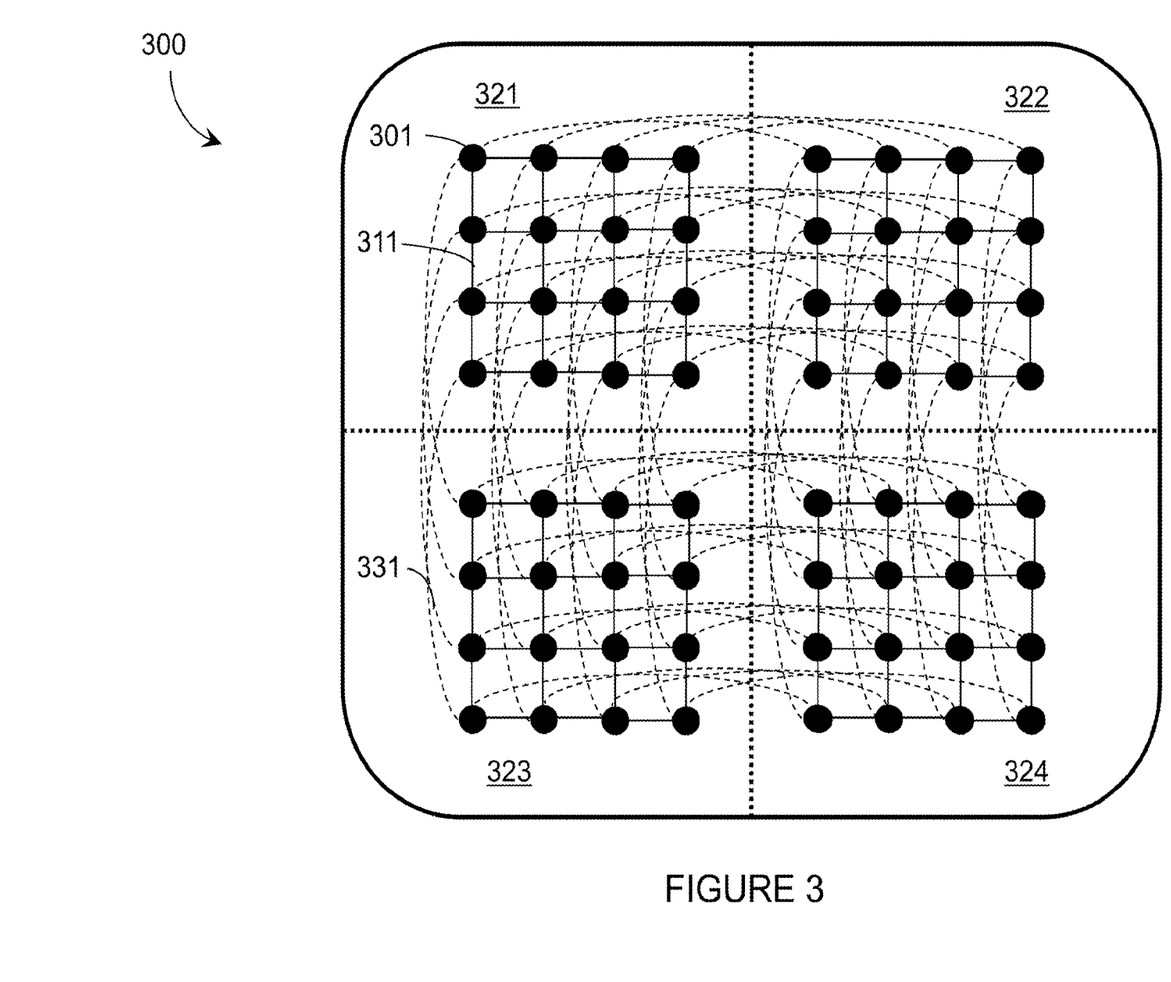
FIG. 3 is a schematic diagram of a portion of an exemplary quantum processor architecture adapted to facilitate replica coding in accordance with the present systems and methods.

FIG. 3 is a schematic diagram of a portion of an exemplary quantum processor architecture 300 adapted to facilitate replica coding in accordance with the present systems and methods. Quantum processor 300 includes qubits 301 (illustrated as solid black nodes, only one called out to reduce clutter) and coupling devices 311 (illustrated as solid black lines, only one called out to reduce clutter). Quantum processor 300 is illustratively divided into four quadrants, with each quadrant representing a specific set of qubits 301 and coupling devices 311 (i.e., a specific instance as described previously). For example, instance 321 includes sixteen qubits 301 and twenty-four couplers 311. Each qubit 301 in instance 321 is coupled to a first corresponding replica qubit in instance 322 and a second corresponding replica qubit in instance 323; each qubit in instance 322 is coupled to a first corresponding replica qubit in instance 321 and a second corresponding replica qubit in instance 324; each qubit in instance 323 is coupled to a first corresponding replica qubit in instance 321 and a second corresponding replica qubit in instance 324; and each qubit in instance 324 is coupled to a first corresponding replica qubit in instance 322 and a second corresponding replica qubit in instance 323. As will be understood form the above description, each of instances 321-324 are nominally identical to one another. Inter-instance couplings are provided by coupling devices 331, which are represented by dashed lines in FIG. 3 (only one called out to reduce clutter). Inter-instance coupling devices 331 may be substantially similar to intra-instance coupling devices 311; however, inter-instance coupling may not need to provide the same range of tenability or strength of coupling as intra-instance coupling and, accordingly, intra-instance coupling devices 331 may be simplified to provide weaker and less tunable coupling than intra-instance coupling devices 311.

Inter-instance coupling devices 331 may be simplified in comparison to intra-instance coupling devices 311. Similarly, some replicas/instances (e.g., at least one of instances 321, 322, 323, 324) may not include read out devices. In some algorithms, it may be necessary to read out from only one instance and not from any replicas. In other algorithms, it may be advantageous to read out form multiple instances, in which case read out devices may be required in multiple or all instances/replicas. Some instances may share read out devices and/or some instances may share at least some programming circuitry.

Figure 4:
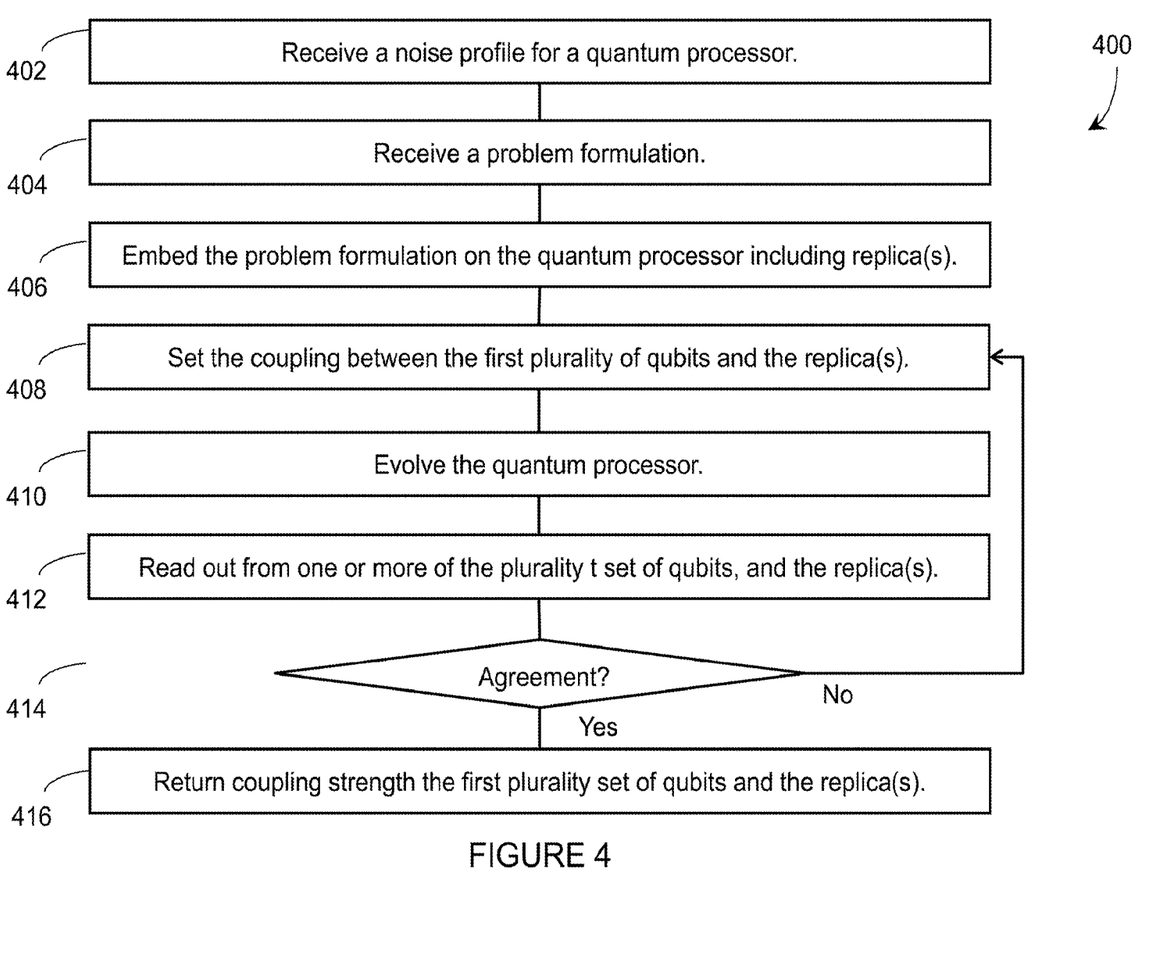
FIGS. 4 and 5 are illustrative flow diagrams showing exemplary methods of implementing replica coding in adiabatic quantum computation (and/or quantum annealing) in accordance with the present systems and methods.

FIG. 4 shows an exemplary method 400 of implementing replica coding in adiabatic quantum computation and/or quantum annealing, in accordance with the present systems and methods. An application of the method 400 is determining a suitable coupling strength between instances. For example, determining a suitable coupling strength between a problem instance and a replica. Not all portions of the method 400 need to be performed. The order of the portions of method 400 shown is exemplary and other orders are possible. Operation and acts with the method 400 are performed by a replica coder or another device for the replica coder.

In some embodiments, a replica coder receives a noise profile for a quantum processor at 402. At 404, the replica coder receives a problem formulation. The problem formulation may, for example, take the form of an optimization problem defined on a graph. At 406, the replica coder embeds or causes the embedding of the problem formulation onto the quantum processor. The embedding causes a first plurality of qubits to be logically associated with or to represent or otherwise be assigned to the problem formulation. Also at 406, the replica coder embeds or causes the embedding of one or more replicas of the problem formulation onto the quantum processor. The embedding causes a second plurality of qubits to be logically associated with or represent or otherwise be assigned to the first replica of the problem formulation. Further replicas may be present, with respective pluralities of qubits logically associated therewith, representing or assigned to the respective replicas.

At 408, the replica coder sets the couplings and the coupling strength between the first plurality of qubits which are logically associated with or represent the problem formulation and sets the couplings and the coupling strengths of the second plurality of qubits logically associated with or which represent the first replica of the problem formulation. In implementations employing further replicas, the replica coder may set the coupling and coupling strength of respective pluralities of qubits. The setting of the couplings and cooling strengths 408 may be an iterative operation. At 410, the quantum processor is evolved by quantum annealing. At 412, the results are read out. For example, a first set of results may be generated by reading out from the first plurality of qubits, and a second set of results from reading out the second plurality of qubits. The reading out 412 may in some implementations be an iterative operation.

The method 400 is potentially iterative with testing 414 and resultant. At 414, the replica coder tests for agreement between the first set of results and the second set of results. If there is more than one replica, testing for agreement is performed between all result sets. In some embodiments, agreement occurs or is found or determined to exist where a qubit and its corresponding replica have the same final value. If agreement is found, the replica coder returns the plurality of couplings between the first plurality of qubits associated with the problem formulation, and the second plurality of qubits associated with replica at 416. If agreement is not found, control returns to 408 where the replica coder iterates through the setting 408, evolving 410, reading out 412, and testing 414. The strategies for setting 408, evolving 410, reading out 412, and testing 414 will vary with specific implementations. In some implementations, the couplings are set at a bottom end of a range and increased with lack of agreement (i.e., disagreement). In some embodiments, the couplings are set at a top end of a range and decreased with agreement. The branching in response to the testing 414 is reversed in such a case.

Figure 5:
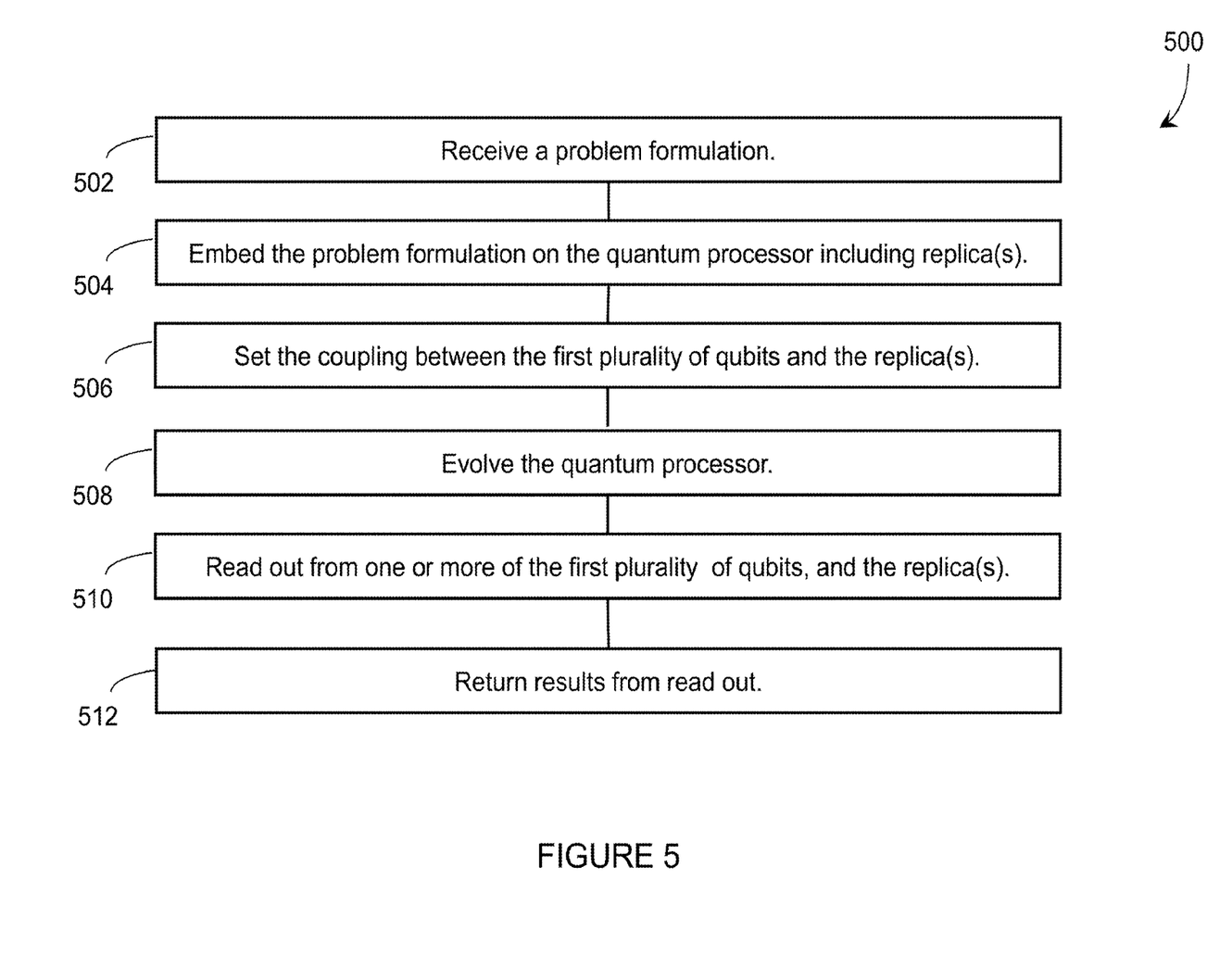

FIG. 5 shows an exemplary method 500 of implementing replica coding in adiabatic quantum computation and/or quantum annealing, in accordance with the present systems and methods. An application of the method 500 includes using one or more replicas to guard against errors in adiabatic quantum computing and/or quantum annealing. The order of the portions of method 500 shown is exemplary and other orders are possible. Operation and acts with the method 500 are performed by a replica coder or another device for the replica coder.

At 502, the replica coder receives a problem formulation. For example, the replica coder may receive an optimization problem defined on a graph. At 504, the problem formulation is embedded onto a quantum processor. For example, a first plurality of qubits may be logically associated with, configured to represent or otherwise assigned to the problem formulation. Also at 504, the replica coder embeds one or more replicas of the problem formulation onto the quantum processor. For example, a second plurality of qubits may be logically associated with, configured to represent or otherwise assigned to the first replica of the problem formulation. Further replicas may be present and embedded at 504. At 506 the replica coder sets the couplings between the first plurality of qubits, the second plurality of qubits, and optionally further plurality of qubits if additional replicas are present.

At 508, the quantum processor is evolved by quantum annealing. The replica coder has ideally set the couplings between the problem formulation and its replica(s) such that correct result is obtained. Methods of finding the correct couplings is described above. A correct solution to many problems is easy to verify, for example, in factoring finding the factors is hard verifying them is simple. At 510, a read out is made of the first plurality of qubits associated with the problem formulation, and a read out is made of the second plurality of qubits associated with the replica. In some embodiments, one of the plurality of qubits associated with the problem formulation or the replicas present is read out. In some embodiments, two or more of the plurality of qubits associated with the problem formulation or the replicas is read out. Where multiple results are present, the results can be compared and used to detect errors. In the case of three or more results, errors can be corrected, for example, by majority voting. At 512, the results from read out are returned, whether those results are correct or not.

Figure 6:
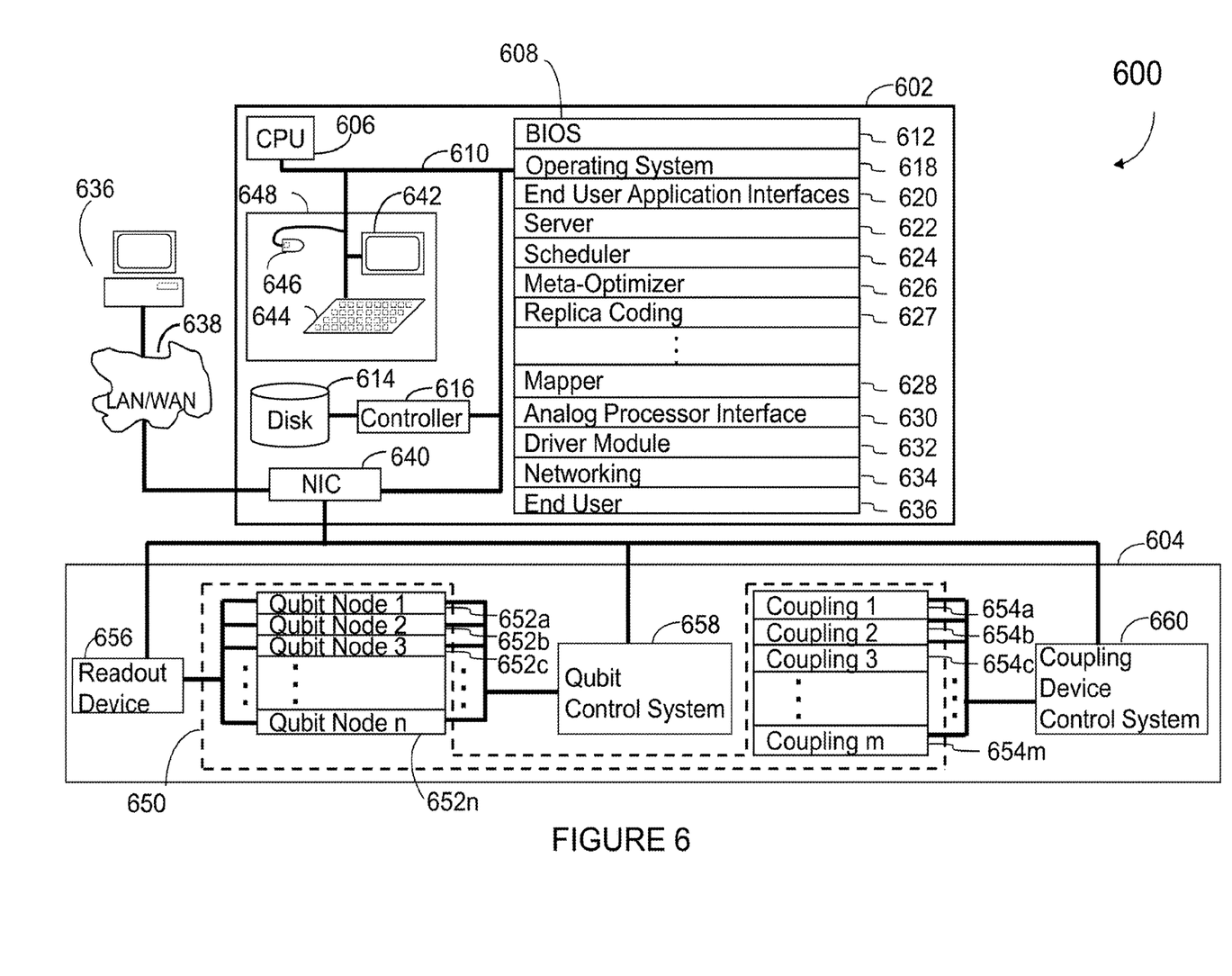
FIG. 6 is a functional block diagram showing a computing system employing at least one quantum processor in accordance with the present systems and methods.

FIG. 6 is a functional block diagram showing a computing system 600 employing at least one quantum processor in accordance with the present systems and methods.

FIG. 6 and the following discussion provide a brief and general description of a suitable computing environment in which various embodiments of an analog computer including a quantum processor. Although not required, embodiments will be described in the general context of computer-executable instructions, such as program application modules, objects or macros being executed by a computer. Those skilled in the relevant an will appreciate that the disclosed systems, methods and articles can be practiced with other computing system configurations, including hand-held devices, multiprocessor systems, microprocessor-based or programmable consumer electronics, personal computers ("PCs"), network PCs, mini-computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 6 shows a computing system 600 operable to solve problems, according to one illustrated embodiment.

The computing system 600 includes a digital computing subsystem 602 and an analog computing subsystem 604 communicatively coupled to the digital computing subsystem 602.

The digital computing subsystem 602 includes one or more processing units 606, system memory 608, and system bus 610 that couple various system components including the system memory 608 to the processing unit 606. The digital computing subsystem 602 will at times be referred to in the singular herein, but this is not intended to limit the application to a single digital computing subsystem 602 since in typical embodiments, there will be more than one digital computing subsystem 602 or other device involved. Other computing systems may be employed, such as conventional and personal computers, where the size or scale of the system allows. The processing unit 606 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 6 are of conventional design. As a result, such blocks need not be described in further detail herein, as they will be understood by those skilled in the relevant art.

The system bus 610 can employ any known bus structures or architectures, including a memory bus with memory controller, a peripheral bus, and a local bus. The system memory 608 may include read-only memory ("ROM") and random access memory ("RAM"). A basic input/output system ("BIOS") 612, which can form part of the ROM, contains basic routines that help transfer information between elements within the digital computing subsystem 602, such as during startup.

The digital computing subsystem 602 also includes non-volatile memory 614. The non-volatile memory 614 may take a variety of forms, for example a hard disk drive for reading from and writing to a hard disk, and an optical disk drive and a magnetic disk drive for reading from and writing to removable optical disks and magnetic disks, respectively. The optical disk can be read by a CD-ROM, while the magnetic disk can be a magnetic floppy disk or diskette. The hard disk drive, optical disk drive and magnetic disk drive communicate with the processing unit 606 via the system bus 610. The hard disk drive, optical disk drive and magnetic disk drive may include appropriate interfaces or controllers 616 coupled between such drives and the system bus 610, as is known by those skilled in the relevant art. The drives, and their associated computer-readable media, provide nonvolatile storage of computer readable instructions, data structures, program modules and other data for the digital computing subsystem 602. Although the depicted digital computing subsystem 602 has been described as employing hard disks, optical disks and/or magnetic disks, those skilled in the relevant art will appreciate that other types of non-volatile computer-readable media that can store data accessible by a computer may be employed, such a magnetic cassettes, flash memory cards, digital video disks ("DVD"), Bernoulli cartridges, RAMs, ROMs, smart cards, etc.

Various program modules or application programs and/or data can be stored in the system memory 608. For example, the system memory 608 may store an operating system 618, end user application interfaces 620, server applications 622, scheduler modules 624, and/or meta-optimizer modules 626. For example, the system memory 608 may store a replica coding module 627 for implementing methods of FIGS. 1-5. Also for example, the system memory 608 may additionally or alternatively store one or more mapper modules 628, analog processor interface modules 630, and/or driver modules 632. The operation and function of these modules are discussed in detail below.

The system memory 608 may also include one or more networking applications 634, for example a Web server application and/or Web client or browser application for permitting the digital computing subsystem 602 to exchange data with sources via the Internet, corporate Intranets, or other networks as described below, as well as with other server applications on server computers such as those further discussed below. The networking application 634 in the depicted embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available such those available from Mozilla and Microsoft.

While shown in FIG. 6 as being stored in the system memory 608, the operating system 618 and various applications 620, 622, 624, 626, 628, 630, 632, 634 and/or data can be stored on the hard disk of the hard disk drive, the optical disk of the optical disk drive and/or the magnetic disk of the magnetic disk drive.

The digital computing subsystem 602 can operate in a networked environment using logical connections to one or more end user computing systems 636 (only one shown), such as one or more remote computers or networks. The digital computing subsystem 602 may be logically connected to one or more end user computing systems 636 under any known method of permitting computers to communicate, for example through a network 638 such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, the digital computing subsystem 602 is connected to the LAN through an adapter or network interface card 640 (communicative linked to the system bus 610). When used in a WAN networking environment, the digital computing subsystem 602 may include an interface and modem (not shown) or other device, such as the network interface card 640, for establishing communications over the WAN/Internet.

In a networked environment, program modules, application programs, or data, or portions thereof, can be stored in the digital computing subsystem 602 for provision to the networked computers. In one embodiment, the digital computing subsystem 602 is communicatively linked through the network 638 with TCP/IP middle layer network protocols; however, other similar network protocol layers are used in other embodiments, such as user datagram protocol ("UDP"). Those skilled in the relevant art will readily recognize that the network connections shown in FIG. 6 are only some examples of establishing communications links between computers, and other links may be used, including wireless links.

While in most instances the digital computing subsystem 602 will operate automatically, where an end user application interface is provided, an operator can enter commands and information into the digital computing subsystem 602 through the end user application interface 648 including input devices, such as a keyboard 644, and a pointing device, such as a mouse 646. Other input devices can include a microphone, joystick, scanner, etc. These and other input devices are connected to the processing unit 606 through the end user application interface 620, such as a serial port interface that couples to the system bus 610, although other interfaces, such as a parallel port, a game port, or a wireless interface, or a universal serial bus ("USB") can be used. A monitor 642 or other display device is coupled to the bus 610 via a video interface, such as a video adapter (not shown). The digital computing subsystem 602 can include other output devices, such as speakers, printers, etc.

The analog computing subsystem 604 includes an analog processor, for example, a quantum processor 650. The quantum processor 650 includes multiple qubit nodes 652$a$, $b$, $c$, and so on to n (collectively 652) and multiple coupling devices 654$a$, $b$, $c$, and so on to m (collectively 654).

The analog computing subsystem 604 includes a readout device 656 for reading out one or more qubit nodes 652. For example, readout device 656 may include multiple dc-SQUID magnetometers, with each dc-SQUID magnetometer being inductively connected to a qubit node 652 and NIC 640 receiving a voltage or current from readout device 656. The dc-SQUID magnetometers comprise a loop of superconducting material interrupted by two Josephson junctions and are well known in the art.

The analog computing subsystem 604 also includes a qubit control system 658 including controller(s) for controlling or setting one or more parameters of some or all of the qubit nodes 652. The analog computing subsystem 604 further includes a coupling device control system 660 including coupling controller(s) for coupling devices 654. For example, each coupling controller in coupling device control system 660 may be capable of tuning the coupling strength of a coupling device 654 between a minimum and a maximum value. Coupling devices 654 may be tunable to provide ferromagnetic or anti-ferromagnetic coupling between qubit nodes 652.

Where computing system 600 includes a driver module 632, the driver module 632 may include instructions to output signals to quantum processor 650. NIC 640 may include appropriate hardware required for interfacing with qubit nodes 652 and coupling devices 654, either directly or through readout device 656, qubit control system 658, and/or coupling device control system 660. Alternatively, NIC 640 may include software and/or hardware that translate commands from driver module 632 into signals (e.g., voltages, currents, optical signals, etc.) that are directly applied to qubit nodes 652 and coupling devices 554. In another alternative, NIC 640 may include software and/or hardware that translates signals (representing a solution to a problem or some other form of feedback) from qubit nodes 652 and coupling devices 654. In some cases, analog processor interface module 630 may communicate with driver module 632 rather than directly with NIC 640 in order to send and receive signals from quantum processor 650.

The functionality of NIC 640 can be divided into two classes of functionality: data acquisition and control. Different types of chips may be used to handle each of these discrete functional classes. Data acquisition is used to measure the physical properties of qubit nodes 652 after quantum processor 650 has completed a computation. Such data can be measured using any number of customized or commercially available data acquisition micro-controllers including, but not limited to, data acquisition cards manufactured by Elan Digital Systems (Fareham, UK) including the AD132, AD136, MF232, MF236, AD142, AD218 and CF241 cards. Alternatively, data acquisition and control may be handled by a single type of microprocessor, such as the Elan D403C or D480C. There may be multiple NICs 640 in order to provide sufficient control over qubit nodes 652 and coupling devices 654 and in order to measure the results of a computation conducted on quantum processor 650.

Coupling devices 654 may either couple qubits 652 together ferromagnetically or anti-ferromagnetically or not couple qubits 652 together. A ferromagnetic coupling between two qubits 652 drives the qubits 652 to have the same state, whereas an anti-ferromagnetic coupling drives the qubits 652 to have opposite states, Charge-based coupling devices 654 may also be used. More information on coupling devices 654 useful in the present systems, methods and articles can be found in U.S. patent application Ser. No. 11/247,857 (now U.S. Pat. No. 7,619,437).

The analog computing subsystem 604 may be a superconducting quantum computer, examples of which include qubit registers, readout devices and ancillary devices. Superconducting quantum computers normally are operated at milliKelvin temperatures and often are operated in a dilution refrigerator. An example of a dilution refrigerator is the Leiden Cryogenics B.V. MNK 126 series (Galgewater No. 21, 2311 VZ Leiden, The Netherlands). All or part of the components of the analog computing subsystem 604 may be housed in the dilution refrigerator. For example, qubit control system 658 and coupling device control system 660 may be housed outside the dilution refrigerator with the quantum processor 650 being housed inside the dilution refrigerator.

Superconducting qubits useful in the present systems, methods and articles include superconducting flux qubits and superconducting charge qubits, both described in Makhlin et al., 2001, *Reviews of Modern Physics* 73, pp. 357-400. Examples of flux qubits that can be used include rf-SQUIDs, which have a superconducting loop interrupted by a Josephson junction, and persistent current qubits, which have a superconducting loop interrupted by three Josephson junctions. See Mooij et al., 1999, *Science* 285, 1036; and Orlando et al., 1999, *Physical Review B* 60, 15398. Other examples of superconducting qubits can be found in Il'ichev et al., 2003, *Physical Review Letters* 91, 097906; Blatter et al., 2001, *Physical Review B* 63, 174511; and Friedman et al., 2000, *Nature* 406, 43. In addition, hybrid charge-phase qubits may also be used, and examples of hybrid qubits can be found in U.S. Pat. Nos. 6,838,694 and 7,335,909.

Superconducting coupling devices useful in the present systems, methods and articles include rf-SQUIDs and dc-SQUIDs, which couple qubits together by flux. As described previously, SQUIDs have a superconducting loop interrupted by one (an rf-SQUID) or two (a dc-SQUID) Josephson junctions. In some cases, the coupling devices used may be capable of both ferromagnetic and anti-ferromagnetic coupling.

The readout devices 656, may also be superconducting devices, such as a dc-SQUID, or instead, a tank circuit may be used for the readout devices 656. The readout devices 656 may read out the state of a qubit 652 in the flux regime, or alternatively, read out the state of the qubit in the charge regime, Charge-based readout devices and charged-based local bias devices may be used.

The various embodiments described herein provide both systems for facilitating replica coding in quantum processor architectures as well as methods of implementing replica coding in quantum processor architectures. An exemplary system is provided in FIG. 3. An exemplary method is illustrated in FIG. 2, where a problem instance in programmatically mapped to (e.g., encoded or embedded in) a first set of qubits, the same problem instance in programmatically mapped to (e.g., encoded or embedded in) a second set of qubits, and coupling is provided between at least some qubits in the first set of qubits and at least some qubits in the second set of qubits.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, International (PCT) patent applications referred to in this specification and/or listed in the Application Data Sheet, including U.S. provisional patent application Ser. No. 61/761,100, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An analog computer for solving a computational problem, the analog computer comprising a quantum processor, the quantum processor comprising:
a first set of qubits and a first set of coupling devices providing communicative coupling between qubits the first set of qubits, the first set of qubits and the first set of coupling devices representing a first instance of the computational problem programmed into the quantum processor;
a first set of replica qubits and a first set of replica coupling devices providing communicative coupling between the first set of replica qubits, the first set of replica qubits and the first set of replica coupling devices representing a second instance of the computational problem programmed into the quantum processor, wherein for each qubit in the first set of qubits a corresponding replica qubit exists in the first set of replica qubits, and for each coupling device in the first set of coupling devices a replica coupling device exists in the first set of replica coupling devices; and a second set of coupling devices, wherein each coupling device in the second set of coupling devices provides communicative coupling between a qubit in the first set of qubits and the corresponding replica qubit in the first set of replica qubits, wherein at least some of the coupling devices of each of the first set of coupling devices, the first set of replica coupling devices, and the second set of coupling devices are operable to provide a respective diagonal coupling, and wherein the analog computer is selectively operable perform quantum annealing on the first and the second instances of the computational problem at the same time to reduce the effects of decoherence and noise.

2. The analog computer of claim 1 wherein the quantum processor is a superconducting quantum processor, the qubits in the first set of qubits and the first set of replica qubits are superconducting qubits, and the coupling devices in the first set of coupling devices, the first set of replica coupling devices, and the second set of coupling devices are superconducting coupling devices.

3. The analog computer of claim 2 wherein the qubits are superconducting flux qubits.

4. The analog computer of claim 1 wherein the number of coupling devices in the second set of coupling devices is less than the number of qubits in the first set of replica qubits.

5. The analog computer of claim 1 wherein the number of coupling devices in the second set of coupling devices is equal to the number of qubits in the first set of replica qubits.

6. The analog computer of claim 1 wherein the communicative coupling between the qubits in the first set of qubits and the corresponding replica qubits in the first set of replica qubits is weak compared to the communicative coupling between the qubits in the first set of qubits.

7. The analog computer claim 6 wherein the communicative coupling between the qubits in the first set of qubits and the corresponding replica qubits in the first set of replica qubits has a characteristic strength, wherein the characteristic strength is:

greater than or equal to the noise in the communicative coupling between the qubits in the first set of qubits, and less than a characteristic value for the communicative coupling between the qubits in the first set of qubits.

8. The analog computer of claim 6 wherein the communicative coupling between the qubits in the first set of qubits and the corresponding replica qubits in the first set of replica qubits has a characteristic strength, wherein the characteristic strength is expressed as a fraction of a characteristic value for the communicative coupling between the qubits in the first set of qubits and is selected from the group of ranges consisting of: $1/100,000$ to $1/2$; $1/100$ to $1/10$; and $1/25$ to $1/15$.

9. The analog computer of claim 1 further comprising:

a first interface that in use provides number of off-diagonal single qubit terms of the Hamiltonians of the first set of qubits and the first set of replica qubits;

a second interface that in use provides number of diagonal single qubit terms of the Hamiltonians of the first set qubits and the first set of replica qubits; and a third interface that in use provides number of diagonal two qubit terms of the Hamiltonians of the first set of qubits and the first set of replica qubits, wherein the diagonal two qubit terms is associated with the first set of coupling devices and the first set of replica coupling devices.

10. A non-transitory machine-readable storage medium, comprising processor executable instructions which, when executed by at least one processor, cause the at least one processor to:

receive a problem formulation;

cause the problem formulation to be embedded onto a quantum processor of an analog computer, the analog computer selectively operable to perform quantum annealing;

cause a replica of the problem formulation to be embedded onto the quantum processor;

cause a plurality of couplings to be set between a first plurality of qubits associated with the problem formulation embedded on the quantum processor, and a second plurality of qubits associated with the replica of the problem formulation embedded on the quantum processor;

cause an evolution of the quantum processor by performing quantum annealing by the analog computer on the problem formulation and the replica of the problem formulation at the same time to reduce the effects of decoherence and noise;

cause a read out from the first plurality of qubits associated with the problem formulation embedded on the quantum processor, and from the second plurality of qubits associated with the replica of the problem formulation embedded on the quantum processor to create a first set of results and a second set of results; and test for agreement between the first set of results and the second set of results.

11. The non-transitory machine-readable storage medium of claim 10 wherein, when executed by the at least one processor, the processor executable instructions further cause the at least one processor to:

in response to a determination that there is agreement at least between the first set of results and the second set of result, return the plurality of couplings between the first plurality of qubits associated with the problem formulation embedded on the quantum processor, and the second plurality of qubits associated with the replica of the problem formulation embedded on the quantum processor.

12. The non-transitory machine-readable storage medium of claim 10 wherein, when executed by the at least one processor, the processor executable instructions further cause the at least one processor to:

in response to a determination that there is not agreement at least between the first set of results and the second set of result, iteratively:

cause the plurality of couplings to be reset between the first plurality of qubits associated with the problem formulation embedded on the quantum processor, and the second plurality of qubits associated with the replica of the problem formulation embedded on the quantum processor, cause a further evolution of the quantum processor by performing quantum annealing by the analog computer on the problem formulation and the replica of the problem formulation at same time to reduce the effects of decoherence and noise, cause a further read out from the first plurality of qubits associated with the problem formulation embedded on the quantum processor, and from the second plurality of qubits associated with the replica of the problem formulation embedded on the quantum processor to create a third set of results and a fourth set of results, and test for agreement between the third set of results and the fourth set of results.

13. The non-transitory machine-readable storage medium of claim 10 wherein, when executed by the at least one processor, the processor executable instructions further cause the at least one processor to:

receive a noise profile for the quantum processor.

14. The non-transitory machine-readable storage medium of claim 10 wherein to cause the plurality of couplings to be set between the first plurality of qubits associated with the problem formulation, and the second plurality of qubits associated with the replica of the problem formulation, the processor executable instruction:

cause the plurality of couplings to be set to one or more weak values.

15. The non-transitory machine-readable medium of claim 10 wherein the plurality of couplings include a diagonal component.

16. The non-transitory machine-readable storage medium of claim 10 wherein, when executed by the at least one processor, the processor executable instructions further cause the at least one processor to:

select a first number for the plurality of couplings that is less than the number of qubits the first plurality of qubits associated with the problem formulation.

17. A method comprising:

receiving a problem formulation;

embedding the problem formulation onto an analog computer for solving a computational problem, the analog computer comprising a quantum processor;

embedding a replica of the problem formulation onto the quantum processor of an analog computer, the analog computer selectively operable to perform quantum annealing;

setting a plurality of couplings between a first plurality of qubit associated with the problem formulation embedded on the quantum processor, and a second plurality of qubit associated with the replica of the problem formulation embedded on the quantum processor;

evolving the quantum processor by performing quantum annealing by the analong computer on the problem formulation and the replica of the problem formulation at the same time reduce the effects of decoherence and noise;

reading out from a first readout plurality of qubits selected from the group consisting of the first plurality of qubits associated with the problem formulation embedded on the quantum processor, and from the second plurality of qubits associated with the replica of the problem formulation embedded on the quantum processor to create a first set of results;

reading out from a second readout plurality of qubits selected from the group consisting of the first plurality of qubits associated with the problem formulation embedded on the quantum processor, and the second plurality of qubits associated with the replica of the problem formulation embedded on the quantum processor to create a second set of results; and testing for agreement between the first set of results and the second set of results.

18. The method of claim 17 further comprosing:

returning the first set of results.

19. The method of claim 17 further comprising:

providing via a first interface a number of off-diagonal single qubit terms of the Hamiltonians of the first plurality of qubits and the second plurality of qubits;

providing via a second interface a number of diagonal single qubit terms of the Hamiltonians of the first plurality of qubits and the second plurality of qubits; and providing via a third interface a number of diagonal two qubit terms of the Hamiltonians of the first plurality of qubits and the second plurality of qubits.

20. The method of claim 17 wherein setting the plurality of couplings between the first plurality of qubit associated with the problem formulation embedded on the quantum processor, and the second plurality of qubit associated with the replica of the problem formulation embedded on the quantum processor, further comprises:

setting the plurality of couplings to one or more weak values.

* * * * *

UNITED STATES PATENT AND TRADEMARK OFFICE
CERTIFICATE OF CORRECTION

PATENT NO. : 9,870,277 B2
APPLICATION NO. : 14/778478
DATED : January 16, 2018
INVENTOR(S) : Andrew J. Berkley Page 1 of 2

It is certified that error appears in the above-identified patent and that said Letters Patent is hereby corrected as shown below:

In the Claims

Column 16, Lines 59-60:
"communicative coupling between qubits the first set of qubits," should read, --communicative coupling between qubits in the first set of qubits,--.

Column 17, Lines 17-18:
"is selectively operable perform quantum annealing on the first" should read, --is selectively operable to perform quantum annealing on the first--.

Column 17, Lines 60-61:
"a first interface that in use provides number of off-diagonal single qubit terms" should read, --a first interface that in use provides a number of off-diagonal single qubit terms--.

Column 17, Lines 63-64:
"a second interface that in use provides number of diagonal single qubit terms" should read, --a second interface that in use provides a number of diagonal single qubit terms--.

Column 17, Lines 64-65:
"terms of the Hamiltonians of the first set qubits and the first set" should read, --terms of the Hamiltonians of the first set of qubits and the first set--.

Column 17, Lines 66-67:
"a third interface that in use provides number of diagonal two qubit terms" should read, --a third interface that in use provides a number of diagonal two qubit terms--.

Column 19, Lines 16-17:
"problem formulation, the processor executable instruction:" should read, --problem formulation, the processor executable instructions:--.

Signed and Sealed this
Seventh Day of August, 2018

Andrei Iancu
*Director of the United States Patent and Trademark Office*

CERTIFICATE OF CORRECTION (continued)
U.S. Pat. No. 9,870,277 B2

Column 19, Lines 39-42:
"between a first plurality of qubit associated with the problem formulation embedded on the quantum processor, and the second plurality of qubit associated with the replica" should read, --between a first plurality of qubits associated with the problem formulation embedded on the quantum processor, and the second plurality of qubits associated with the replica--.

Column 20, Line 4:
"at the same time reduce the effects of decoherence" should read, --at the same time to reduce the effects of decoherence--.

Column 20, Line 22:
"The method of claim 17 further comprosing:" should read, --The method of claim 17 further comprising:--.

Column 20, Lines 36-39:
"between the first plurality of qubit associated with the problem formulation embedded on the quantum processor, and the second plurality of qubit associated with the replica" should read, --between the first plurality of qubits associated with the problem formulation embedded on the quantum processor, and the second plurality of qubits associated with the replica--.